United States Patent
Giannattasio et al.

(10) Patent No.: US 10,759,699 B2
(45) Date of Patent: Sep. 1, 2020

(54) ADDITIVE COMPOSITION FOR BITUMINOUS CONGLOMERATES WITH HIGH MECHANICAL PERFORMANCES

(71) Applicant: ITERCHIMICA S.R.L., Suisio (BG) (IT)

(72) Inventors: Federica Giannattasio, Suisio (IT); Sergio Cisani, Bergamo (IT); Elisa Bertuletti, Suisio (IT)

(73) Assignee: ITERCHIMICA S.R.L., Suisio (BG) (IT)

( * ) Notice: Subject to any disclaimer, the term of this patent is extended or adjusted under 35 U.S.C. 154(b) by 0 days.

(21) Appl. No.: 16/466,515

(22) PCT Filed: Nov. 5, 2018

(86) PCT No.: PCT/EP2018/080169
§ 371 (c)(1),
(2) Date: Jun. 4, 2019

(87) PCT Pub. No.: WO2019/091915
PCT Pub. Date: May 16, 2019

(65) Prior Publication Data
US 2020/0062648 A1 Feb. 27, 2020

(30) Foreign Application Priority Data
Nov. 7, 2017 (IT) .................. 102017000126622

(51) Int. Cl.
| | | |
|---|---|---|
| *C04B 14/02* | (2006.01) | |
| *C04B 24/26* | (2006.01) | |
| *C04B 26/26* | (2006.01) | |
| *C04B 40/00* | (2006.01) | |
| *C04B 111/00* | (2006.01) | |

(52) U.S. Cl.
CPC ........ *C04B 24/2623* (2013.01); *C04B 14/026* (2013.01); *C04B 24/2611* (2013.01); *C04B 26/26* (2013.01); *C04B 40/0039* (2013.01); *C04B 2111/0075* (2013.01)

(58) Field of Classification Search
CPC . C04B 24/2623; C04B 24/2611; C04B 26/26; C04B 14/026; C04B 40/0039; C04B 2111/0075
See application file for complete search history.

(56) References Cited

U.S. PATENT DOCUMENTS

| | | |
|---|---|---|
| 2009/0163625 A1 | 1/2009 | Lang et al. |
| 2011/0260116 A1 | 10/2011 | Plee et al. |
| 2014/0058048 A1 | 2/2014 | Sawa et al. |

FOREIGN PATENT DOCUMENTS

| | | |
|---|---|---|
| CN | 102585520 A | 7/2012 |
| CN | 103509356 A | 1/2014 |
| CN | 106280505 A | 1/2017 |
| WO | 2013053882 A1 | 4/2013 |
| WO | 2015179553 A2 | 11/2015 |

OTHER PUBLICATIONS

International Search Report and Written Opinion for Corresponding International Application No. PCT/EP2018/080169 (10 Pages) (dated Jan. 28, 2019).

*Primary Examiner* — Patrick D Niland
(74) *Attorney, Agent, or Firm* — Lucas & Mercanti, LLP

(57) ABSTRACT

Additive composition compositions intended to be mixed into bituminous conglomerates for road paving, comprising containing a thermoplastic polymer, a polymeric compound selected from the group consisting of polyvinylbutyral (PVB), polyethylacrylate (PEA) polymethylacrylate (PMA), polybutylacrilate (PBA), lignin and mixtures thereof, and graphene are disclosed. preferably wherein The graphene is contained in a quantity between 0.005 and 1% by weight based on the total weight of the composition. A bituminous conglomerate suitable for making a road paving, containing comprising aggregates, filler, bitumen and said the additive is also disclosed.

17 Claims, No Drawings

ADDITIVE COMPOSITION FOR BITUMINOUS CONGLOMERATES WITH HIGH MECHANICAL PERFORMANCES

CROSS-REFERENCE TO RELATED APPLICATIONS

This application is a 371 of PCT/EP2018/080169, filed Nov. 5, 2018, which claims the benefit of Italian Patent Application No. 102017000126622, filed Nov. 7, 2017.

FIELD OF APPLICATION

The present invention refers to the technical field of the production of bituminous conglomerates for road paving.

In particular, the invention refers to an additive composition for bituminous conglomerates which allows to improve the mechanical performances of the bituminous conglomerate comprising said additive, as well as prolonging the lifetime of the road paving made with such bituminous conglomerate.

PRIOR ART

The need to develop technologies and products as much environmentally friendly as possible is still actual in all the field of the petrochemical industry, especially in the field of asphalt and bituminous conglomerates.

This need entails searching for materials which are the most compatible as possible with the natural and anthropic environment, as well as trying to optimize the processes of production thereof, decreasing the overall exploitation of raw materials, therefore of the carbon footprint due to such processes.

It is further well known in the art the use of additives for improving the performances of the bituminous conglomerates, and of the asphalts in general, for example such additives can be compositions comprising thermoplastic polymers for improving the mechanical properties of the bituminous asphalt containing such additives, in particular the breaking strength and resistance to cracks formation in the bituminous conglomerate, typically used as covering surface for roads.

A composition of asphalt, comprising aggregates, granular or powder material deriving from rubber scrap, for example tyres, and a mixture of thermoplastic polymers and co-polymers, as well as additional additives and filling materials, is described in the international patent application WO2015179553.

The Chinese patent application CN106280505 refers to an additive for asphalts in form of a mixture, comprising polyolefins in granules and other materials including a plasticiser, preferably dioctylphthalate. This additive too is effective in decreasing cracks formation in asphalts made with it.

The Chinese patent CN102585520 refers to an additive for asphalt, comprising polypropylene, polyethylene, PVB, comprising dioctylphthalate as plasticizer as well, and moreover: a dispersing agent, a thixotropic agent and a metal-based powder. This additive improves the performances of the asphalt mixtures.

The Chinese patent application CN103509356 also relates to an asphalt mixture comprising polyolefins (polyethylene, styrene-butadiene-styrene, polyethylene terephthalate), polyvinylbutyral as binding agent and a filling material.

In any case, although the additives for improving the chemical and mechanical properties of the commercially available asphalts, as well as the asphalts which can be made with said additives, are in general formulated keeping in mind the environmental impact, for example comprising scrap materials from other industrial processes or recycled materials, as it is the case for example of the asphalt composition described in application WO2015179553, such products are still not able to combine the improvement of the mechanical properties of the bituminous conglomerates with a concrete decrease of the environmental impact in producing the same, at both a qualitative and quantitative level of the raw material used.

In the light of the above mentioned prior art, the problem underlying the present invention was to provide an additive composition intended to be mixed into bituminous conglomerates for road paving, wherein the composition were suitable for improving the mechanical properties of the bituminous conglomerate made by mixing said composition with other appropriate components and at the same time lacks the above mentioned drawbacks, therefore at the same time being more environmentally sustainable.

SUMMARY OF THE INVENTION

Said problem has been solved by providing an additive composition intended to be mixed into a bituminous conglomerate for road paving and suitable for improving the mechanical properties of said bituminous conglomerate, comprising at least one thermoplastic polymer, a polymeric compound selected from the group consisting of polyvinylbutyral (PVB), polyethylacrylate (PEA) polymethylacrylate (PMA), polybutylacrilate (PBA), lignin and mixtures thereof, and graphene.

More preferably, said at least one thermoplastic polymer is a polyolefin, preferably it is polyethylene, or polypropylene, or any other mixture of polyethylene and polypropylene.

More preferably, said thermoplastic polymer is a mixture of polyethylene and polypropylene comprising a quantity of polyethylene between 25 and 75% by weight based on the total weight of the mixture.

Even more preferably said thermoplastic polymer is a mixture of polyethylene and polypropylene as reported in the following Table 1, wherein the values by weight are calculated on the total weight of the mixture of polyethylene and polypropylene.

TABLE 1

| Polyethylene (%) | Polypropylene (%) |
|---|---|
| 30 | 70 |
| 40 | 60 |
| 50 | 50 |
| 60 | 40 |
| 70 | 30 |

Preferably, said at least one thermoplastic polymer is recycled material.

Alternatively, the thermoplastic polymer used in the additive composition according to the present invention is virgin material or a mixture of the above-mentioned recycled material and virgin material.

Advantageously, the additive composition according to the present invention, intended to be mixed into bituminous conglomerates, can essentially consists of the above-mentioned components, without the aid of further components, such as plasticizers, sulfur compounds, salts and/or other materials.

In equally preferred manner, the polymeric compound contained in the additive composition according to the invention is polyvinylbutyral (PVB).

According to a preferred embodiment, the above-mentioned polymeric compound is a recycled compound, preferably recycled PVB, more preferably obtained by means of a process of recovery of the same from the post-usage treatment of vehicle windscreen and/or double glazing of buildings.

Alternatively, the above-mentioned polymeric compound, in particular polyvinylbutyral, used in the additive composition according to the present invention is virgin material or a mixture of the above-mentioned recycled material and virgin material.

In accordance with the present invention, with the term "graphene" is meant a carbon material with two-dimensional structure of carbon monoatomic layers with hexagonal matrix, wherein each carbon atom is bound to other three carbon atoms by a covalent bond and bound to the atoms of the adjacent layers by Van Der Waals forces, as well as it is meant any derivative functionalized of such carbon material, for example graphene oxide, i.e. graphene partially functionalized with oxygen comprising groups.

The graphene used in the additive composition according to the present invention preferably has an apparent density between 2 and 100 $g/dm^3$, more preferably between 10 and 70 $g/dm^3$; at the same time, graphene used in the additive composition according to the present invention has a superficial area between 10 and 300 $m^2/g$.

Said superficial area is measured by means of a BET method by absorption of inert gas (nitrogen), in particular according to the procedure ISO 9277:2010.

Further, the lateral dimensions of the graphene layers are smaller than 200 μm, preferably smaller than 100 μm, more preferably smaller than 50 μm.

According to a preferred embodiment, the graphene used in the additive composition according to the present invention is recycled graphene.

Alternatively, the graphene used in the additive composition according to the present invention is virgin graphene or a mixture of recycled graphene and virgin graphene.

Therefore, in an absolutely advantageous manner, the additive composition intended to be mixed into bituminous conglomerates for road paving according to the invention can exist as mixture of partially or totally recycled materials; the additive composition according to the invention is consequently particularly environmentally sustainable, determining not only a clear net saving of raw materials, but also a related decrease of carbon dioxide emissions (which would otherwise be emitted in the environment during the processes of synthesis of the materials at issue).

Preferably, the graphene included in the additive composition according to the invention is contained in a quantity between 0.005 and 1%, more preferably between 0.005 and 0.15%, even more preferably between 0.01 and 0.1% by weight based on the total weight of the composition.

In equally preferred manner, the above-mentioned thermoplastic polymer comprised in the additive composition according to the invention is contained in a quantity between 45 and 95%, more preferably between 50 and 90% by weight based on the total weight of the composition.

In equally preferred manner, the above-mentioned polymeric compound comprised in the additive composition according to the invention, preferably polyvinylbutyral, is contained in a quantity between 5 and 55%, more preferably between 10 and 50% by weight based on the total weight of the composition.

A particularly preferred additive composition intended to be mixed into bituminous conglomerates consists of the following components, expressed in percentage by weight based on the total weight of the composition:

| | |
|---|---|
| thermoplastic material | 50-95 |
| polyvinylbutyral | 5-50 |
| graphene | 0.005-1 |

All the percentages indicated in the text of the present application are to be understood as weight/weight percentages, unless otherwise specified.

The additive composition according to the invention is produced in particle form, for example in granular form or in form of chips, preferably with particles having an average diameter between 0.5 and 10 mm, more preferably between 4 and 6 mm, or in form of powder, preferably with particles having an average diameter between 0.08 and 3 mm, more preferably between 0.5 and 3 mm.

Consistently, the additive composition according to the invention can be obtained by a process comprising the separate grinding of the above-mentioned thermoplastic polymer, of the polymeric compound, preferably polyvinylbutyral, and of the graphene and their subsequent mixing.

In a totally preferred manner, the above-mentioned process to obtain the additive composition according to the invention results in obtaining an additive composition according to the invention in form of powder or in granular form with particles having an average diameter between 0.08 and 3 mm, preferably between 0.5 and 3 mm.

Preferably, the above-mentioned grinding step can be performed with the aid of a mill with cooled rotor or a granulator rotor or by cryogenic grinding.

Advantageously, the use of the additive composition according to the present invention, in any of its embodiments, is also envisaged to produce bituminous conglomerates, in order to improve their mechanical performances, as well as to prolong the lifetime of the road paving made with such bituminous conglomerates.

The above-mentioned additive composition according to the invention can in turn be used to prepare a bituminous conglomerate suitable for making road paving with high mechanical performances. Such bituminous conglomerate includes aggregates, including, for example, inert, inorganic materials such as crushed stone materials, granular and crushed slag, artificial aggregates produced, for example, by high temperature melting of certain minerals or rocks (e.g. bauxite or certain clays), fillers, bitumen as well as the above-mentioned additive composition, which is generally contained in a quantity between 0.09 and 15%, preferably between 2 and 6%, more preferably 5%, by weigh based on the total weight of said bitumen Preferably, said bituminous conglomerate includes a bitumen quantity of between 3 and 7% by weight based on the total weight of the bituminous conglomerate, more preferably a bitumen quantity of between 4 and 6.5% by weight based on the total weight of the bituminous conglomerate.

In accordance with the present invention, with the term "bitumen" is generally meant a material comprising a solid dispersing phase at room temperature, having a thermoplastic behavior, said dispersing phase includes high molecular weight organic compounds, mainly hydrocarbons with a number of carbon atoms higher than 25. In said dispersing phase can generally be dispersed traces of sulfur, nitrogen, oxygen and metal such as nickel, iron and vanadium.

Thus, in one of its further aspects, the present invention relates to a method for producing a bituminous conglomerate suitable for making a road paving with high mechanical performances, comprising the step of adding to said aggregates, under stirring and at a varying temperature between 130° C. and 200° C., preferably between 165° C. and 185° C., more preferably between 170° C. and 180° C., an additive composition as described above according to the invention, as well as comprising bitumen and a filler.

In an absolutely advantageous manner, the additive composition according to the present invention, when added to bituminous conglomerates for road paving, allows to obtain a road pavement with high mechanical performances, such as high tensile strength, high stiffness and high fatigue resistance, as it is explained in more detail with reference to the detailed description.

Consistently, a road surface made with a bituminous conglomerate comprising the additive composition according to the present invention has also a scarce tendency in relation to the rutting phenomenon, with respect to a road surface made with a bituminous conglomerate not comprising the additive composition according to the invention, as it will be explained in more detail with reference to the detailed description.

The high mechanical properties conferred to the road paving by the additive composition mixed into the bituminous conglomerate, as well as the considerable decrease of the rutting phenomenon, determine a substantial increase of the service life of the road paving, as well as of the safety thereof, when compared to a traditional road paving.

In a totally advantageous manner, when a bituminous conglomerate comprising the additive composition according to the present invention is used in making a road paving, the layers of the latter (base course, binder course and surface course) can have a smaller thickness, given the same service life, when compared to a road paving made with a bituminous conglomerate not comprising the additive composition according to the invention.

Therefore, the use of a conglomerate comprising such additive composition entails not only the need of a smaller quantity of aggregates and bitumen, determining a decrease of carbon dioxide emissions which would otherwise occur in the production/extraction and in the transportation of the above-mentioned raw materials, but also a substantial energy saving (and related smaller environmental impact) due to the smaller production of bituminous conglomerate which, as previously illustrated, needs handlings at quite high temperatures.

Moreover, the composition according to the present invention is easy and safe to handle, because it is free from fine powders, which might be inhaled by the operators who use it.

The composition according to the present invention can moreover be stored for prolonged periods of time, even for many months, without risks of packing, and maintains its flowability properties unaltered over time, which properties are important when adding this composition to the bituminous conglomerate, in order to ensure its accurate and reproducible dosing.

The characteristics and the advantages of the present invention will be further highlighted by some embodiments thereof, which are hereinafter exposed by way of illustration and not of limitation.

DETAILED DESCRIPTION

Hereinafter are some examples of additive compositions according to the present invention, which have been prepared and tested with favorable results in relation to their effect of increasing the mechanical performances in the production of bituminous conglomerate. Finally, a comparative example follows, wherein a possible additive composition is shown, not comprising graphene and not according to the present invention.

Example 1

| | |
|---|---|
| Mixture of polyethylene and polypropylene (70:30) | 49.995% |
| polyvinylbutyral | 49.995% |
| virgin graphene | 0.01% |

Example 2

| | |
|---|---|
| Mixture of polyethylene and polypropylene (50:50) | 49.95% |
| polyvinylbutyral | 49.95% |
| virgin graphene | 0.1% |

Example 3

| | |
|---|---|
| Mixture of polyethylene and polypropylene (60:40) | 49.95% |
| polyvinylbutyral | 49.95% |
| recycled graphene | 0.1% |

Example 4

| | |
|---|---|
| Mixture of polyethylene and polypropylene (30:70) | 74.995% |
| polyvinylbutyral | 24.995% |
| virgin graphene | 0.01% |

Example 5

| | |
|---|---|
| Mixture of polyethylene and polypropylene (50:50) | 74.95% |
| polyvinylbutyral | 24.95% |
| virgin graphene | 0.1% |

Example 6

| | |
|---|---|
| Mixture of polyethylene and polypropylene (70:30) | 79.995% |
| polyvinylbutyral | 19.995% |
| virgin graphene | 0.01% |

Example 7

| | |
|---|---|
| Mixture of polyethylene and polypropylene (40:60) | 79.95% |
| polyvinylbutyral | 19.95% |
| virgin graphene | 0.1% |

Example 8

| | |
|---|---|
| Mixture of polyethylene and polypropylene (70:30) | 89.995% |
| polyvinylbutyral | 9.995% |
| virgin graphene | 0.01% |

Example 9

| | |
|---|---|
| Mixture of polyethylene and polypropylene (70:30) | 89.95% |
| polyvinylbutyral | 9.95% |
| virgin graphene | 0.1% |

Example 10

| | |
|---|---|
| Mixture of polyethylene and polypropylene (60:40) | 89.5% |
| polyvinylbutyral | 9.5% |
| virgin graphene | 1% |

Example 11

| | |
|---|---|
| Mixture of polyethylene and polypropylene (70:30) | 89.990% |
| polyvinylbutyral | 9.995% |
| virgin graphene | 0.005% |

Example 12 (Reference Example not According to the Invention)

| | |
|---|---|
| Mixture of polyethylene and polypropylene (70:30) | 90.00% |
| polyvinylbutyral | 10.00% |

The compositions of Examples 1-11 were prepared by grinding separately the mixture of polyethylene and polypropylene, the polyvinylbutyral and the graphene, and by mixing then the grinded components inside a mixer, obtaining a homogeneous mixture with particles having an average diameter of 2 mm.

The composition of Example 12 was prepared in the same way, starting only from mixture of polyethylene and polypropylene and from polyvinylbutyral.

Example 13

Using the composition according to Example 8, eighteen briquettes of bituminous conglomerate with a diameter of 100 mm and a thickness of about 25 mm, containing such composition according to the proportions of the ingredients indicated in the following Table 2 (Conglomerate A), were prepared in the laboratory. Also eighteen briquettes of bituminous conglomerate with the same composition but comprising the additive composition according to Example 12 (Conglomerate B), and eighteen briquettes of bituminous conglomerate not comprising the additive composition according to Example 8, nor the composition according to Example 12 (Conglomerate C), as well as nine panels of bituminous conglomerate, three for each type of conglomerate A, B and C.

TABLE 2

| Materials | Bituminous conglomerate A, containing the composition of Example 8 Parts by weight | Bituminous conglomerate B, containing the composition of Example 12 Parts by weight | Bituminous conglomerate C, without any additive Parts by weight |
|---|---|---|---|
| Inerts grit 12/20 | 25 | 25 | 25 |
| Inerts grit 6/12 | 35 | 35 | 35 |
| Inerts grit 3/6 | 10 | 10 | 10 |
| Sand 0/4 | 25 | 25 | 25 |
| Filler (CaCO$_3$) | 5 | 5 | 5 |
| Bitumen 70/100 | 4.5 | 4.5 | 4.5 |
| Additive composition | 0.27 | 0.27 | 0 |
| Total | 104.77 | 104.77 | 104.5 |

The bituminous conglomerate is prepared in the laboratory by means of the procedure that follows, using devices which simulate, in function, machinery on higher scale, usually used in plants for the production of bituminous conglomerate:
- selecting a granulometric curve, depending on the road paving which is desired to be made with the bituminous conglomerate currently under preparation;
- selecting aggregates according to the above-mentioned granulometric curve, in the present case the aggregates according to Table 2, and bringing the aggregates to a temperature of 170-180° C. inside a mixer;
- adding an appropriate quantity of additive composition, in the present case the additive composition according to Example 8 in the quantity expressed in Table 2, then mixing for 40-60 seconds so as to obtain a blend;
- adding to the blend an appropriate quantity of bitumen, in the present case the quantity expressed in Table 2, then mixing for at least 20-30 seconds;
- adding to the blend an appropriate quantity of filler, in the present case the quantity expressed in Table 2, then mixing for at least 5 minutes (as provided by the normative law EN 12697-35), obtaining a homogeneous blend of bituminous conglomerate.

In particular, the blend is maintained at a temperature between 170 and 180° C. during all the steps of processing thereof.

In case of the bituminous conglomerate B, instead of the composition of Example 8 according to the invention, the composition of Example 12 not according to the invention (which is graphene-free) is added. In the case of the bituminous conglomerate C, after the step of heating the aggregates, a step of adding bitumen to them directly follows.

The blend of bituminous conglomerate obtained thereby is then discharged from the mixer, dosed in a quantity equal to about 1210 g in containers and subsequently it is conditioned in oven at a temperature of 150° C. for about 3 hours (to simulate the transportation conditions).

The bituminous conglomerate obtained thereby, after the step of oven conditioning, is then inserted inside a template. Then, in order to obtain a voids percentage of about 2.5%, a compaction by means of gyratory compactor is performed (alternatively to the gyratory compactor it is possible to use any other type of compactor suitable for the purpose, for example a Marshall compactor):

Load pressure: 600 kPa;
Gyratory angle: 1.25°;
Limit density: 2400 kg/m³.

18 briquettes were made for each type of bituminous conglomerate for performing the mechanical tests, simultaneously three panels of 50 cm×70 cm size were formed, one for each type of bituminous conglomerate.

The eighteen briquettes of conglomerate A, the eighteen briquettes of conglomerate B and the eighteen briquettes of conglomerate C, as well as the panels of conglomerate A, the panels of conglomerate B and the panels of conglomerate C have been finally placed in climatic chambers for the appropriate conditioning for performing the mechanical tests.

Example 14 (Determination of the Tensile Strength)

Six briquettes of conglomerate A, six briquettes of conglomerate B and six briquettes of conglomerate C were used to perform a tensile strength test.

Each briquette was respectively housed in a mechanical press of the designated test basket, then a tensile strength test was performed according to the methodology UNI EN 12697-23.

The mechanical characterization occurred with the Indirect Tensile Strength (ITS). The ITS simulates the maximum stress generated by vehicle passage which can be tolerated by the road pavement.

The results of the individual tests are shown in Table 3, which follows.

TABLE 3

| Mixture | ITS (MPa) |
| --- | --- |
| Conglomerate A | 1.71 |
| Conglomerate B | 1.57 |
| Conglomerate C | 1.07 |
| Mixture (comparison) | Percent change (%) |
| A vs. B | +8.9 |
| A vs. C | +59.8 |
| B vs C. | +46.7 |

From the data reported in Table 3 it is possible to note that the additive composition according to the present invention allows to increase the Indirect Tensile Strength by about 60% in a bituminous conglomerate made with it (conglomerate A) if compared with a traditional bituminous conglomerate with bitumen as such (conglomerate C), and by 9% if compared to a bituminous conglomerate comprising an additive composition substantially identical regarding polyethylene/propylene and PVB contents but which is graphene-free (conglomerate B). An increase of the Indirect Tensile Strength implies therefore a higher strength of the bituminous conglomerate subjected to load and, therefore, the additive composition according to the present invention allows to formulate a bituminous conglomerate which allows to build a road paving characterized by a longer service life. The considerable increase of direct tensile strength obtained with the composition according to the present invention, if compared to a composition which is identical except for lacking a graphene quantity of only 0.01% by weight, has to be considered totally surprising.

Example 15 (Determination of the Stiffness Modulus)

Six briquettes of conglomerate A, six briquettes of conglomerate B and six briquettes of conglomerate C were used to perform a test for determining the stiffness modulus, meant as capability of bituminous conglomerates to propagate in the superstructure the load exerted in the road surface from the track areas of the vehicle tyres.

Each briquette was respectively placed on a designated housing of a servo-pneumatic system for dynamic tests, which was in turn contained in a climatic cell for temperature control; subsequently, a test for the determination of the stiffness modulus was performed according to the methodology UNI EN 12697-26.

The test conditions used for the determination of the stiffness modulus were:

Temperature: variable;

Imposed horizontal strain: 5 µm;

Peak time: 124 ms (frequency 2 Hz);

Poisson Coefficient: 0.35.

The results of the individual tests are shown in Table 4, which follows.

TABLE 4

| | Stiffness of the samples at different temperatures (MPa) | | |
| --- | --- | --- | --- |
| Mixture | T = 5° C. | T = 20° C. | T = 40° C. |
| Conglomerate A | 21124 | 7809 | 3003 |
| Conglomerate B | 20866 | 6685 | 2691 |
| Conglomerate C | 10169 | 5711 | 1096 |
| Mixture (comparison) | Percent change (%) | | |
| A vs. B | +1.2% | +16.8% | +11.6% |
| A vs. C | +107.7% | +36.7% | +174.0% |
| B vs C. | +105.2% | +17.1% | +145.5% |

As it is obvious, the additive composition according to the invention (Example 8), when used for the formulation of a bituminous conglomerate, determines in the latter a substantial increase of the stiffness modulus with respect to both the traditional conglomerate (conglomerate C) and the conglomerate comprising the additive composition according to Example 12, which is graphene-free (conglomerate B). In this sense, the conglomerate A shows to be particularly performing at moderately high temperatures (T=20° C.; T=40° C.). The increase in stiffness modulus found for conglomerate A with respect to conglomerate B is even higher of the already considerable increase of the tensile strength found in the previous example and therefore even more surprising.

Example 16 (Determination of the Fatigue Resistance)

Six briquettes of conglomerate A, six briquettes of conglomerate B and six briquettes of conglomerate C were used to perform the fatigue resistance test. The failure due to fatigue of a paving happens because of the repetition over time of deforming states, induced by tensile stresses which are caused by both the vehicle traffic and the seasonal cycles and temperature change.

Each briquette was respectively placed on a designated housing of a servo-pneumatic system for dynamic tests, which was in turn contained in a climatic cell for temperature control; subsequently, a test for the determination of the fatigue resistance was performed according to the methodology UNI EN 12697-24.

The test conditions for the determination of the fatigue resistance were:
Temperature: 20° C.;
Imposed horizontal strain: 300 kPa;
Peak time: 248 ms;
Rest time: 252 ms;
Frequency: 2 Hz;
Poisson Coefficient: 0.35;
Failure condition: 10% of the initial complex modulus.

The results of the individual tests are shown in Table 5, which follows.

TABLE 5

| Mixture | Number of cycles at failure |
|---|---|
| Conglomerate A | 1,056,933 |
| Conglomerate B | 473,167 |
| Conglomerate C | 157,639 |
| Mixture (comparison) | Percent change(%) |
| A vs. B | +123.4% |
| A vs. C | +570.5% |
| B vs C. | +200.2% |

From the data of Table 5 it can be understood that the conglomerate A, comprising the additive composition according to the invention (Example 8), has a number of fatigue cycles increased by 123% if compared to the bituminous conglomerate B, comprising the additive reference composition according to Example 12, which is graphene-free, and increased to 570% if compared to a traditional bituminous conglomerate (conglomerate C). This is a further, impressive evidence of the surprising improvement of the mechanical performances of the conglomerate, wherein said improvement is accomplished thanks to the presence of graphene, although added in an extremely low quantity (0.01% of the total weight of the additive composition added to the bituminous conglomerate).

Example 17 (Monitoring the Rutting Phenomenon)

Three panels of conglomerate A, three panels of conglomerate B and three panels of conglomerate C were used to perform the test of monitoring the rutting, meant as a phenomenon of longitudinal deformation caused by a thickening under the loading axle with consequent lateral movement of the bituminous mixture during wheel passage. Each panel was respectively placed on a designated housing in a rutting machine (wheel tracking machine), which was in turn contained in a climatic cell for temperature control; subsequently, a test for the determination of the fatigue resistance was performed according to the methodology UNI EN 12697-22.

The lab test which allows to simulate such phenomenon provides the following results:
DEPTH: it physically indicates how deep is the rut (higher depth means lower resistance);
PRD (Proportional Ruth Depth): it indicates the percentage of rut generated during the test at the predetermined cycle; by reducing said parameter, the deformation is decreased and therefore the service life of the paving is increased;
WTS (Wheel Tracking Slope): it indicates the rate at which the bituminous conglomerate gets deformed; by reducing said value, the resistance to deformation is increased and the deformation over time is decreased, increasing the service life of the paving.

The test condition imposed for the determination of the resistance to rutting was a temperature of 60° C.

The results of the individual tests are shown in Table 6, which follows.

TABLE 6

| | Rut depth at 5,000 cycles (mm) | Rut depth at 10,000 cycles (mm) | PRD air 10,000 (%) | WTS air (mm/1000 cycles) |
|---|---|---|---|---|
| Conglomerate A | 0.43 | 0.48 | 0.8 | 0.009 |
| Conglomerate B | 0.88 | 0.98 | 1.6 | 0.022 |
| Conglomerate C | 1.39 | 1.55 | 2.5 | 0.025 |
| Mixture (comparison) | Percent change (%) | | | |
| A vs. B | −51.1% | −51.0% | −50.0% | −59.1% |
| A vs. C | −69.1% | −69.0% | −68.0% | −64.0% |
| B vs C. | −36.7% | −36.8% | −36.0% | −12.0% |

The tests performed allow to highlight the high performances of the conglomerate A, comprising the additive composition according to the present invention, with a considerable decrease of the rutting phenomenon (−51%) if compared to the bituminous conglomerate B, with consequent further increase of the service life of the paving and of the road safety, if compared to the traditional paving (conglomerate C).

In this case, too, it can be noted that the graphene contained in the additive composition according to the present invention, although said graphene is present in a definitely small quantity (0.01% by weight in the composition according to Example 8), determines a considerable and surprising increase of resistance to rutting.

Ultimately, all the experimental evidences show that the additive composition according to the invention allows to produce bituminous conglomerates with increased performances in terms of mechanical properties, consequently determining an extension of the total life of the road paving made with them. This determines not only an economic saving (less maintenance of the road pavement), but also a considerable decrease of the environmental impact (possibility to make a thinner layer of conglomerate, if compared to a conglomerate without the additive composition according to the invention, given the same lifetime, with consequent reduced carbon dioxide emissions due to the production of the conglomerate itself), as well as an increase of the overall safety in using the road paving at issue.

The invention claimed is:

1. An additive composition intended to be mixed into a bituminous conglomerate for road paving and suitable for improving the mechanical properties of bituminous conglomerate, comprising a thermoplastic polymer, polyvinylbutyral, and graphene,
wherein the thermoplastic polymer is a polyolefin or a mixture of polyolefins.

2. Additive composition according to claim 1, wherein the thermoplastic polymer is a recycled material.

3. Additive composition according to claim 1, wherein the polyvinylbutyral is a recycled polyvinylbutyral.

4. Additive composition according to claim 1, wherein the graphene is recycled graphene.

5. Additive composition according to claim 1 wherein the graphene is contained in the additive composition in a quantity between 0.005 and 1%, by weight based on the total weight of the composition.

6. Additive composition according to claim 1, wherein the thermoplastic polymer is contained in the additive composition in a quantity between 45 and 95% by weight based on the total weight of the composition.

7. Additive composition according to claim 1, wherein the polyvinylbutyral is contained in the additive composition in a quantity between 5 and 55% by weight based on the total weight of the composition.

8. Additive composition according to claim 1, consisting of the following components, expressed in percentage by weight based on the total weight of the composition:
thermoplastic material 50-95;
polyvinylbutyral 5-50; and
graphene 0.005-1.

9. Additive composition according to claim 1, being in granular form or in form of chips, or in powder form.

10. Bituminous conglomerate suitable for making a road paving with improved mechanical properties, comprising aggregates, filler, bitumen and the additive composition according to claim 1, wherein the additive composition is contained in the bituminous conglomerate in a quantity between 0.09 and 15%, by weight based on the total weight of the bitumen.

11. A process for producing a bituminous conglomerate suitable for making a road paving with high mechanical performances, comprising the step of adding to said aggregates, under stirring and at a temperature between 130° C. and 200° C., the additive composition according to claim 1, bitumen and a filler.

12. Additive composition according to claim 1, wherein the thermoplastic polymer is selected from the group consisting of polyethylene, polypropylene and mixtures thereof.

13. Additive composition according to claim 12, wherein the thermoplastic polymer is a mixture of polyethylene and polypropylene comprising a quantity of polyethylene between 25 and 75% by weight based on the total weight of the mixture.

14. Additive composition according to claim 5, wherein the graphene is contained in the additive composition in a quantity between 0.005 and 0.15% by weight based on the total weight of the composition.

15. Additive composition according to claim 14, wherein the graphene is contained in the additive composition in a quantity between 0.01 and 0.1% by weight based on the total weight of the composition.

16. Additive composition according to claim 6, wherein the thermoplastic polymer is contained in the additive composition in a quantity between 50 and 90% by weight based on the total weight of the composition.

17. Additive composition according to claim 7, wherein the polyvinylbutyral is contained in the additive composition in a quantity between 10 and 50% by weight based on the total weight of the composition.

* * * * *